United States Patent Office 2,709,163
Patented May 24, 1955

2,709,163

ACRYLONITRILE-VINYL PYRIDINE COPOLYMER SULFONIC ACID REACTION PRODUCT

Monroe Couper and William Kenneth Wilkinson, Waynesboro, Va., assignors to E. I. du Pont de Nemours & Company, Wilmington, Del., a corporation of Delaware No Drawing. Application July 5, 1952,
Serial No. 297,388

8 Claims. (Cl. 260—79.3)

This invention relates to the treatment of copolymers of acrylonitrile to improve their color and thermal stability. More particularly, the invention is directed to thermal color stabilization of yarns, filaments, fibers, tubes and the like of copolymers of acrylonitrile containing a small percentage of a basic component such as a vinyl pyridine.

Yarns and the like of acrylonitrile homopolymers are dyed with difficulty. To extend the depth and range of colors, copolymers of acrylonitrile with a vinyl pyridine, such as 2-vinyl pyridine or 2-methyl-5-vinylpyridine, have been prepared. The presence of a small portion of basic pyridine groups in the polymer greatly enhances the dyeability of yarn and filament structures made therefrom, but also promotes thermal discoloration. In many cases this discoloration is very pronounced and decidedly objectionable. Furthermore, if the basic polymer of a dispersion or solution thereof is improperly handled, substantial darkening may take place to the detriment of the color of the yarn prepared therefrom.

The objects of this invention are to provide a substantially color stable basified polymer of acrylonitrile. Another object is the provision of color stable copolymers of acrylonitrile and vinylpyridine in solid forms, such as films, filaments and similar objects. Other objects will be apparent from the description that follows.

The objects of this invention are accomplished by combining with the basified acrylonitrile polymer a small amount of a sulfonic acid. Preferably, di- or polysulfonic acids are used, and for optimum results the sulfonic acid, either aryl or alkyl, is added to the polymer dispersion or solution prior to spinning into filaments, yarns, or the like, so that the sulfonic acid is effective during the shaping and is uniformly distributed in the solid product. Nevertheless, basified acrylonitrile polymer yarns, staples, fabrics, or the like after their formation may be impregnated with sulfonic acids to produce structures having improved thermal stability. The sulfonic acid is generally used in sufficient quantity to neutralize all the basic sites in the polymer. Substantial improvement results when 80% or 90% of these basic sites are neutralized. It is preferred to neutralize all the basic sites in order to get optimum results. In general, the amount of sulfonic acid in the shaped article will be from about 4% to about 20% by weight, based on the amount of polymer in the article. The salt that is formed by the basic polymer and the sulfonic acid is a new composition having properties improved over the parent polymers.

The following examples will serve to further explain and illustrate the invention.

EXAMPLE I

A fiber-forming copolymer of 95.8% by weight of acrylonitrile and 4.2% by weight of 2-methyl-5-vinyl pyridine was prepared by the usual method. Polymer solutions were prepared in dimethylformamide to give a concentration of 23% solids. Other than for the control sample, the acids listed in Table I below were added by dissolving them in the dimethylformamide prior to the polymer addition. Yarns were spun by the dry or evaporative spinning process, washed with hot 13% aqueous dimethylformamide for 1 hour to remove the bulk of residual solvent, and then steam drawn to four times its original length. The various yarn samples in the form of skeins were tested for thermal stability by boiling in an aqueous solution containing ½% Palmolive soap for ½ hour, after which the yarn samples were air dried and then heated at 165° C. for twenty minutes.

Table I

| Additive | Percent by Weight on Polymer | Initial Yarn Color | Thermal Stability |
|---|---|---|---|
| None (control) | | Yarn, poor color | Dark yellow. |
| p-toluene sulfonic acid | 10 | Light yellow | Yellow. |
| Octadecyl sulfonic acid | 14 | -----do----------- | Do. |
| Methane sulfonic acid | 6 | -----do----------- | Do. |
| Naphthalene-2-sulfonic acid | 8 | -----do----------- | Do. |
| Chloroacetic acid | 6 | Very yellow | Dark brown. |
| Pyromellitic acid | 5 | -----do----------- | Do. |
| Phenylphosphoric acid | 7 | -----do----------- | Very dark orange. |

It will be noted that the control sample containing no acid neutralizing agents was yellow in color before these stability tests and the color increased to a deep yellow as the results of this test. From the solutions containing the various sulfonic acids listed, at the cencentration shown, yarns of light yellow were produced which darkened only slightly as a result of the stability test. This shows the improvement in color stability as compared with the control. The color of the samples containing acids other than the sulfonic acids were not at all improved, but rather were more deeply colored as produced and decidedly darker and even less color stable than the control sample.

Using methane sulfonic acid as above a film was prepared. This film was greatly superior to a control when tested for discoloration by oven-heating. Washing the sulfonic acid out with water destroyed the improvement.

As shown above, an improvement in color results from the addition of a monosulfonic acid to the polymer solution. Certain of these sulphonic acids are partially removed by water washing. Since it is necessary to neutralize all the basic sites in the copolymer and to maintain these sites neutralized for optimum results, excess acid is used. Generally, a 5–10% excess is used. The excess acid either goes to waste or has to be recovered, and, therefore, acids that do not wash out are preferred. Di- and polysulfonic acids are such acids as is evidenced by the following example.

EXAMPLE II

The copolymer of Example I was used to prepare a series of spinning solutions similar to those of Example I. In this test the neutralizing acids included di- and trisulfonic acids which were incorporated in dimethylformamide solutions of the methyl vinyl pyridine/acrylonitrile copolymer, dry-spun, and the resulting yarn processed and tested as described under Example I. The results are contained in Table II below.

Table II

| Additive | Percent by Weight on Polymer | Initial Yarn Color | Thermal Stability |
|---|---|---|---|
| None, control | | Yellow | Golden. |
| p-toluenesulfonic acid | 10 | Cream colored | Yellow. |
| Ethane disulfonic acid | 5 | -----do----------- | Pale yellow. |
| 1,3,6-naphthalene trisulfonic acid | 7 | -----do----------- | Do. |
| Diethyl phenyl sulfonic acid | 5 | -----do----------- | Do. |
| Methylene-bis-naphthalene-sulfonic acid | 5 | -----do----------- | Do. |
| m-benzene disulfonic acid | 4.7 | -----do----------- | Do. |

These data show that the several di- and trisulfonic acid modified yarn samples are initially lighter in color and are much more stable to color change at elevated temperatures than the control or any of the yarn samples of Example I. Results similar to those obtained in the above examples are gotten when the polymer used is 2-vinyl pyridine.

As shown above the stabilizer of this invention may be any hydrocarbon sulfonic acid. It may have one or more sulfonic acid groups in the molecule and may be monomeric or polymeric in nature. For example, sulfonated polybenzyl gave satisfactory stabilization. Of the various sulfonic acids, the disulfonic acids are preferred for they are readily available, cheap and give a permanent bond. The stabilizers of this invention are colorless materials and do not interfere with the subsequent dyeing of the stabilized articles.

The di- and polysulfonic acids, even though some of them are more water soluble than many of the monosulfonic acids tested, are not removed by washing and boil-off treatments. This is surprising and well established by titration curves and by the improved stability at elevated temperatures. These sulfonates are loosely bound or are attached to nitrogens in the same polymer chain, since cross-linking is not evident. There is no increase in solution viscosity nor increased gelation tendency. Subsequent dyeing of these structures with acid dyes is readily accomplished with excellent results, since the acid dyes themselves are all sulfonic acids and can easily compete to replace the lower molecular weight sulfonic acids of this invention.

Not only do these sulfonic acids inhibit or retard color formation, but they increase the effectiveness of the basic groups in the polymer for acceptance of acid dyes and a smaller amount of basic group may be incorporated in the polymer with equivalent dyeing results. As a result, the color problem is lessened and the amount of neutralizing sulfonic acid that needs to be used is reduced. For instance, a yarn prepared from a copolymer consisting of 4.2% of 2-methyl-5-vinyl pyridine and 95.8 of acrylonitrile which has not been modified by the addition of any neutralizing sulfonic acid dyes to about the same shade as a yarn prepared from similar polymer consisting of only 3% 2-methyl-5-vinyl pyridine and 97% acrylonitrile and containing about 4% by weight of ethane disulfonic acid.

Fabrics of untreated yarns of basified polymers of acrylonitrile dyed with acid colors gradually change color with ironing due to yellowing of the yarn because of its thermal instability. A fabric dyed blue will attain after several ironings a greenish color because of the yellowness generated by thermal instability. On the other hand, a blue dyed fabric of yarn of this invention retains its blue color over a long period of time and in spite of numerous ironings. Likewise, other colors endure and are substantially unaffected by repeated ironing. One would expect the sulfonic dyes to stabilize the basic groups against subsequent darkening and it is believed they do. The darkening of acid dyed fabrics made with untreated basified acrylonitrile copolymer yarn is apparently due to the fact that there are not enough dye molecules in the shaped articles to neutralize all the basic sites in the polymer, whereas the yarns and fabrics produced in accordance with this invention where care is taken to neutralize all basic sites with di- or polysulfonic acids there still remains after dyeing no free basic group to induce color change in the yarn.

The invention is generally applicable to all acrylonitrile copolymers containing basic groups even though the invention has been illustrated with particular reference to acrylonitrile/2-methyl-5-vinyl pyridine copolymer. The basic groups are derived, in general, from basic nitrogen atoms. Copolymers of acrylonitrile with a vinyl pyridine as disclosed in U. S. Patent 2,491,471 to Arnold dated December 20, 1949, such as copolymers of acrylonitrile with 2-vinyl pyridine, with 4-vinyl pyridine, with 4,6-dimethyl-2-vinyl pyridine, with 5-ethyl-2-vinyl pyridine, with 2 or 4-vinyl quinoline, etc., are all applicable to the process of this invention with good results. The acrylonitrile copolymer may contain in addition to the minor proportion of basic groups one or more other copolymerizing materials, such as methyl methacrylate, methyl acrylate, methyl vinyl ketone, butadiene, vinyl acetate, acrylamide and the like. In fact any of the copolymerizing compounds mentioned in U. S. Patent 2,456,260 to Arnold dated December 14, 1948, may be used along with basic copolymerizing compounds and acrylonitrile with good results. The amount of acrylonitrile in the copolymers is generally at least 85% since the shaped articles from such polymers have more attractive commercial properties than those containing less than 85% acrylonitrile. The stabilizers of this invention can, however, be used effectively with polymers containing less than 85% acrylonitrile. The amount of vinyl pyridine in the copolymers is generally not more than 15% and usually is from about 2% to about 10% by weight of the polymer molecules.

These polymers usually have an average molecular weight between 15,000 and 250,000 as determined by viscosity data using the Staudinger equation; polymers of molecular weight between about 40,000 and about 150,000 are usually preferred.

In attempts to improve the thermal stability, known color stabilizers were added to the polymer dispersion without success; chelating agents to combine with iron or other metallic impurities that might be present were tried without substantial improvement and certain acid neutralizing additions, such as carboxylic acids and phosphonic acids, were also ineffective. U. S. Patent 2,503,245 to Coover et al. discloses the addition of numerous types of acids to solutions of acrylonitrile polymers to prevent discoloration. No mention of basic copolymers is made in this patent and the disclosure is limited to the stabilization of solutions. Many of the stabilizers mentioned in this patent, including carboxylic, phosphoric and phosphonic acids, have been found to have no stabilizing effect for the polymers in solid form, such as filaments. In fact, many of the stabilizers of Coover et al. have deleterious effects, for acid residues that endure through processing deleteriously act on yarns and degrade them. Thus, even though all basic sites are neutralized stabilization does not necessarily follow. There is no suggestion whatever in this patent that the stabilizing agents of this invention would be useful with basified acrylonitrile polymers in solid form. In fact that so many of the conventional stabilizers are ineffective makes the results described above very surprising. So also does the fact that the stabilizers of this invention are not effective in yarns and the like of the homopolymer, polyacrylonitrile.

This invention affords acrylonitrile/vinylpyridine polymer shaped articles, such as yarns, of improved initial color, greatly improved and permanent thermal stability, improved dyeability and improved color retention in ironing dyed materials.

Any departure from the above description which conforms to the present invention is intended to be included within the scope of the claims.

We claim:

1. A shaped article in accordance with claim 8 wherein the said sulfonic acid is a polysulfonic acid.

2. A shaped article in accordance with claim 8 wherein the said sulfonic acid is a disulfonic acid.

3. A shaped article in accordance with claim 8 in which said sulfonic acid is ethane disulfonic acid.

4. A shaped article in accordance with claim 8 in which said sulfonic acid is 1,3,6-naphthalene trisulfonic acid.

5. A shaped article in accordance with claim 8 in which said sulfonic acid is m-benzene disulfonic acid.

6. A shaped article in accordance with claim 8 in which the said vinyl pyridine is 2-vinyl pyridine.

7. A shaped article in accordance with claim 8 in which said vinyl pyridine is 2-methyl-5-vinyl pyridine.

8. Shaped article formed from an acrylonitrile copolymer having a polymerized vinyl pyridine component and containing a thermal discoloration inhibitor consisting of a sulfonic acid of formula $R(SO_2OH)_n$, where R is a hydrocarbon radical and $n$ is a positive integer at most three, in quantity substantially equivalent to the basic nitrogen of the pyridine component and reacted therewith.

References Cited in the file of this patent

UNITED STATES PATENTS

| | | |
|---|---|---|
| 2,491,471 | Arnold | Dec. 20, 1949 |
| 2,491,472 | Harmon | Dec. 20, 1949 |
| 2,564,726 | Saner | Aug. 21, 1951 |